US012674558B2

(12) United States Patent
Zhang et al.

(10) Patent No.: US 12,674,558 B2
(45) Date of Patent: Jul. 7, 2026

(54) LIGHT SOURCE SYSTEM AND LIGHTING SYSTEM

(71) Applicant: YLX INCORPORATED, Shenzhen (CN)

(72) Inventors: Quan Zhang, Shenzhen (CN); Chu Li, Shenzhen (CN)

(73) Assignee: YLX INCORPORATED, Shenzhen (CN)

( * ) Notice: Subject to any disclaimer, the term of this patent is extended or adjusted under 35 U.S.C. 154(b) by 0 days.

(21) Appl. No.: 18/995,348

(22) PCT Filed: Aug. 4, 2023

(86) PCT No.: PCT/CN2023/111134
§ 371 (c)(1),
(2) Date: Jan. 16, 2025

(87) PCT Pub. No.: WO2024/032476
PCT Pub. Date: Feb. 15, 2024

(65) Prior Publication Data
US 2026/0036280 A1 Feb. 5, 2026

(30) Foreign Application Priority Data
Aug. 11, 2022 (CN) ......................... 202222119522.6

(51) Int. Cl.
*F21V 9/08* (2018.01)
*F21V 5/00* (2018.01)
(Continued)

(52) U.S. Cl.
CPC .................. *F21V 9/08* (2013.01); *F21V 5/00* (2013.01); *F21V 29/70* (2015.01); *F21Y 2113/13* (2016.08)

(58) Field of Classification Search
CPC ..... F21V 9/08; F21V 9/40; F21V 5/00; F21V 5/008; F21V 29/70; F21Y 2113/13;
(Continued)

(56) References Cited

U.S. PATENT DOCUMENTS

2005/0013132 A1* 1/2005 Kim ....................... H04N 9/315 362/240
2006/0049782 A1* 3/2006 Vornsand ............... H05B 45/22 315/312
(Continued)

FOREIGN PATENT DOCUMENTS

CN 208535741 U 2/2019
CN 108019634 B 4/2020
(Continued)

OTHER PUBLICATIONS

International Search Report and Written Opinion, corresponding International Application No. PCT/CN2023/111134, mailed Nov. 16, 2023.
(Continued)

*Primary Examiner* — Zheng Song
(74) *Attorney, Agent, or Firm* — MARSHALL, GERSTEIN & BORUN LLP; Michael P. Furmanek

(57) ABSTRACT

The present disclosure discloses a light source system and a lighting system. The light source system includes a light source assembly and a concentrating assembly. The light source assembly includes a main light source assembly and an auxiliary light source assembly. The main light source assembly is configured to generate main light. The auxiliary light source assembly is configured to generate auxiliary light. When the main light source assembly satisfies a preset condition, a proportion of green light or red light in the main light is within a first preset proportion range. The auxiliary light includes blue light and red light. The concentrating assembly is arranged in an exit optical path of the light
(Continued)

source assembly, and is configured to concentrate the main light and the auxiliary light to obtain projection light.

10 Claims, 4 Drawing Sheets

(51) Int. Cl.
*F21V 29/70* (2015.01)
*F21Y 113/13* (2016.01)

(58) Field of Classification Search
CPC .......... F21Y 2115/10; F21W 2131/406; G03B 15/02; G03B 15/03; G03B 15/05
See application file for complete search history.

(56) References Cited

U.S. PATENT DOCUMENTS

| | | | | |
|---|---|---|---|---|
| 2010/0270567 | A1* | 10/2010 | Emerson | H05B 45/30<br>257/89 |
| 2012/0068630 | A1* | 3/2012 | Li | F21S 41/125<br>257/E33.071 |
| 2012/0092862 | A1 | 4/2012 | Chuang et al. | |
| 2015/0092407 | A1* | 4/2015 | Wen | F21V 13/02<br>362/231 |
| 2020/0271283 | A1* | 8/2020 | Onuma | F21V 29/70 |
| 2021/0148546 | A1* | 5/2021 | Zou | G02B 27/149 |
| 2022/0034457 | A1* | 2/2022 | Lambooij | F21K 9/64 |

FOREIGN PATENT DOCUMENTS

| | | | | |
|---|---|---|---|---|
| CN | 215722650 U | | 2/2022 | |
| CN | 216431604 U | | 5/2022 | |
| CN | 216591107 U | | 5/2022 | |
| CN | 218332245 U | | 1/2023 | |
| EP | 2210036 B1 | | 11/2016 | |
| EP | 3203306 B1 | | 7/2019 | |
| WO | WO-2015027786 A1 | * | 3/2015 | F21V 29/70 |
| WO | WO-2021072678 A1 | | 4/2021 | |

OTHER PUBLICATIONS

European Search Report for 23851697.5 mailed Oct. 23, 2025.

* cited by examiner

LIGHT SOURCE SYSTEM AND LIGHTING SYSTEM

CROSS-REFERENCE TO RELATED APPLICATIONS

This is the United States national phase of International Patent Application No. PCT/CN2023/111134, filed on Aug. 4, 2023, which claims priority to Chinese Patent Application No. 202222119522.6, filed on Aug. 11, 2022, the entire contents of each of which are hereby incorporated by reference herein.

TECHNICAL FIELD

The present disclosure relates to the technical field of illumination, and in particular, to a light source system and a lighting system.

BACKGROUND

The light-emitting diode (LED) has been gradually substituting traditional gas discharge lamps to be the main light source for stage lighting applications. The higher the color rendering index of the LED light source is, the higher the requirement of the color reproduction is. However, the present LED lighting instrument used in photography emits light with a color bias toward green or red, and thus has a lower color rendering index, thereby resulting in color distortion and poor color reproduction in images captured by cameras, which is not conducive to the application of LED light sources.

SUMMARY

The present disclosure provides a light source system and a lighting system that can improve the chromatic aberration phenomenon and adjust the color rendering index of the emitted light.

To solve the above technical problems, the technical solutions of the present disclosure are as follows. The present disclosure discloses a light source system. The light source system includes a light source assembly and a concentrating assembly. The light source assembly includes a main light source assembly and an auxiliary light source assembly. The main light source assembly is configured to generate main light. The auxiliary light source assembly is configured to generate auxiliary light. When the main light source assembly satisfies a preset condition, a proportion of green light or red light in the main light emitted by the main light source assembly is within a first preset proportion range. The auxiliary light includes blue light and red light. The concentrating assembly is arranged in an optical path of emergent light of the light source assembly, and is configured to concentrate the main light and the auxiliary light to obtain projection light. The auxiliary light is configured to compensate a color of the main light, to adjust a proportion of green light or red light in the emergent light of the light source assembly to be within a second preset proportion range, and further adjust a color rendering index of the light source system to a preset color rendering index.

In order to solve the foregoing technical problem, the present disclosure provides another technical solution as follows. The present disclosure discloses a light source system. The light source system includes a light source assembly, a filter device and a concentrating assembly. The light source assembly is configured for generating emergent light. A proportion of green light or red light in the emergent light falls within the first preset proportion range. The filter device is arranged in the optical path of the emergent light of the light source assembly, and is configured for filtering the color of the emergent light to obtain filtered light. In an embodiment, the filter device is configured for filtering green light or red light with a proportion within the first preset proportion range in the emergent light, to adjust the proportion of green or red light in the filtered light to the second preset proportion range, and further adjust the color rendering index of the light source system to the preset color rendering index. The concentrating assembly is arranged on the optical path of the light exited from the filter device and is configured for processing the light exited from the filter device to obtain projection light.

In order to solve the foregoing technical problems, the present disclosure provides another technical solution as follows. The present disclosure provides a lighting system. The lighting system includes a lighting device and a light source system connected to each other. The lighting device is configured to emit light after receiving projection light emitted by the light source system, and the light source system is any of the light source systems in the above technical solutions.

The beneficial effects of the present disclosure through the above technical solutions are as follows. The main light source assembly and the auxiliary light source assembly are arranged, the main light source assembly is configured for generating main light, and the auxiliary light source assembly is configured for generating auxiliary light, so that the main light is compensated through the auxiliary light containing blue light and red light, and thus the green or red chromatic aberration issue of the main light can be reduced. In this case, the color temperature of the light source system is maintained constant, and the color rendering index of the light source system is increased to 95, thereby improving the color reproduction degree and ensuring the uniformity of the color of the emergent light of the light source system.

BRIEF DESCRIPTION OF DRAWINGS

In order to more clearly describe the technical solutions of embodiments of the present disclosure, the accompanied drawings to be used in embodiments will be briefly described as below. It is appreciated that the drawings described below are merely some embodiments of the present disclosure, and for those skilled in the art, other drawings can also be obtained based on these drawings without any creative effort.

DESCRIPTION OF EMBODIMENTS

Figure 1:
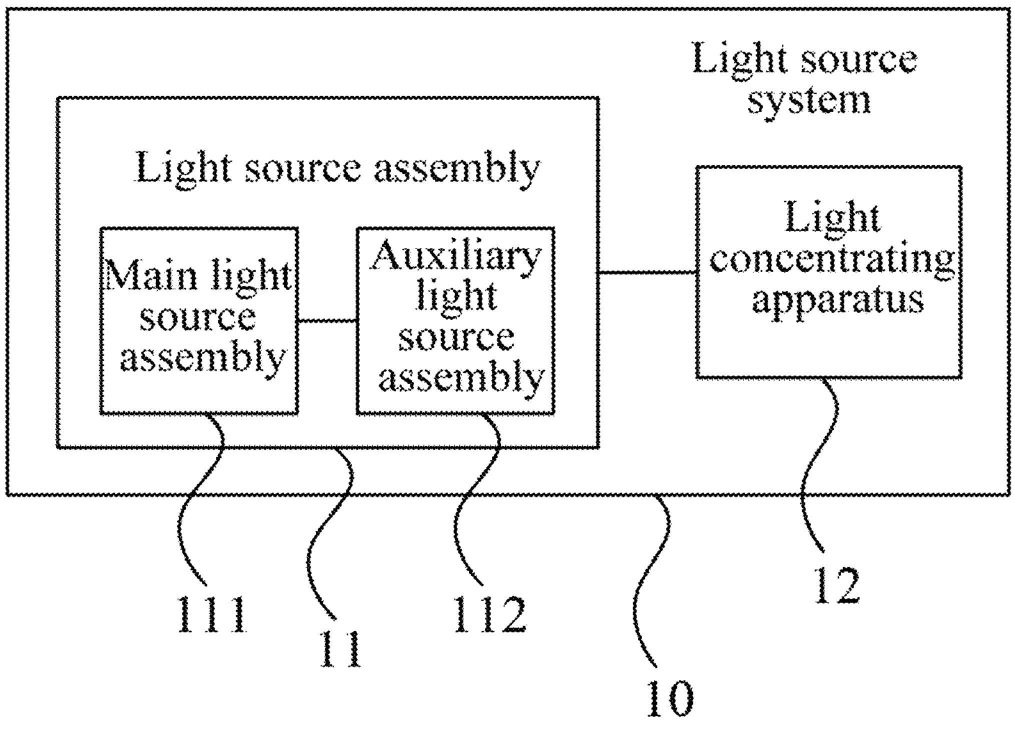
FIG. 1 is a schematic structural diagram of a light source system according to an embodiment of the present disclosure.

The following further describes the present disclosure in detail with reference to the accompanying drawings and embodiments. It is particularly noted that the following embodiments are only used to illustrate the present disclosure, instead of limiting the scope of the present disclosure. Similarly, the following embodiments are only some but not all of the embodiments of the present disclosure, and all other embodiments obtained by those skilled in the art without creative efforts fall within the protection scope of the present disclosure.

The expression "embodiments" mentioned herein means that particular features, structures or characteristics described with reference to embodiments may be included in one or more embodiments of the present disclosure. Phrases appearing at various positions of the specification neither necessarily refer to the same embodiments, nor refer to separate or alternative embodiments that are mutually exclusive with other embodiments. It is explicitly and implicitly understood by those skilled in the art that these embodiments described herein can be combined with other embodiments.

It should be noted that the terms "first", "second", and "third" in the present disclosure are merely used for description purposes, but should not be understood as indicating or implying relative importance or implicitly indicating a quantity of indicated technical features. Therefore, features defined by "first", "second", "third" may explicitly or implicitly include at least one of the features. In the description of the present disclosure, "a plurality of" means at least two, for example, two, three, and the like, unless specifically defined otherwise. Furthermore, the terms "including", "comprising" and "having" and any variations thereof are intended to cover non-exclusive inclusion. For example, a process, a method, a system, a product, or a device containing a series of steps or units may not be limited to the listed steps or units, but may optionally include steps or units which are not listed, or may also optionally include other steps or units inherent to the process, the method, the product, or the device.

The present disclosure discloses a light source system including a light source system and a concentrating assembly. The light source system includes a main light source assembly and an auxiliary light source assembly. The main light source assembly is configured to generate main light. The auxiliary light source assembly is configured to generate auxiliary light. A proportion of green light or red light in the main light emitted by the main light source assembly falls within a first preset proportion range. The auxiliary light includes blue light and red light. The concentrating assembly is arranged in the optical path of emergent light of the light source assembly and is configured to concentrate the main light and the auxiliary light to obtain projection light. The auxiliary light is configured to compensate a color of the main light, so as to adjust a proportion of green light or red light in the emergent light of the light source assembly to be within a second preset proportion range, and further adjust a color rendering index of the light source system to a preset color rendering index.

The following further describes the present disclosure in detail with reference to embodiments. Referring to FIG. 1, which is a schematic structural diagram of a light source system according to an embodiment of the present disclosure, the light source system 10 includes a light source assembly 11 and a concentrating assembly 12.

The light source assembly 11 includes a main light source assembly 111 and an auxiliary light source assembly 112. The main light source assembly 111 is configured to generate main light. The auxiliary light source assembly 112 is configured to generate auxiliary light. The concentrating assembly 12 is arranged in the optical path of the emergent light of the light source assembly 11, and is configured to concentrate the main light and the auxiliary light. The concentrating assembly 12 may be a light concentrating lens. The auxiliary light may include blue light and red light. The wavelength of the red light in the auxiliary light may be greater than 600 nm. The red light in the auxiliary light may be generated by exciting red fluorescent powder with blue light. Alternatively, the red light in the auxiliary light may be generated by synthesizing at least one primary color light, for example, by combining blue light and red light, which is not limited herein.

In an embodiment, when the main light source assembly 111 satisfies the preset condition, the proportion of green light in the main light falls within the first preset proportion range, and the proportion of each primary color light in the emitted main light from the main light source assembly 111 can be dynamically detected. When the proportion of green light in the main light falls within the first preset proportion range, it is determined that the preset condition is satisfied. In an embodiment, a value of the range within the first preset proportion is higher than the proportion of any other color in the main light. When the proportion of green light in the main light falls within the first preset proportion range, it indicates that there is a chromatic aberration issue of green bias. The specific value of the first preset proportion range can be set according to the actual application requirements. The setting of the first preset proportion range may vary depending on the requirements of the color rendering of the application scenarios, which is not limited herein. For example, in a television studio shooting scenario, the color rendering requirements are higher, and thus the tolerance for chromatic aberration is stricter. In this case, the first preset proportion range can be set smaller to improve the sensitivity to the chromatic aberration issues. In contrast to the television studio shooting, in a stage lighting scenario, the color rendering requirements are lower. Therefore, the first preset proportion range can be set larger.

When the main light source assembly 111 is in the preset state, the above-mentioned chromatic aberration issues are prone to occurring. The preset state may include a cold driving state. In the cold state driving state, the efficiency of exciting green light by blue light in the main light source is high, while the efficiency of exciting red light by blue light in the main light source is low, so that the green light has a higher proportion in the main light source. The preset state may further include a dimming state. When the main light source assembly 111 is in the dimming state, as the luminance of blue light decreases, the efficiency of exciting green light is higher, the efficiency of exciting red light is lower, so that the chromatic aberration issue that is the same as in the cold driving state also occurs. It can be understood that, in other embodiments, the preset state may further include a malfunction of the red LED, which results in a lower luminous flux and chromatic aberration issues. The preset state that causes chromatic aberration issues is not limited herein.

Further, the auxiliary light may be configured to compensate the color of the main light, so as to adjust the proportion of the green light in the emergent light of the light source assembly to be within the second preset proportion range, thereby increasing the color rendering index of the emergent light of the light source assembly to the preset color rendering index. The second preset proportion range is a normal color rendering range, and may be set according to actual situations or experience, which is not limited herein. It can be understood that, in another embodiment, the preset conditions may further include whether the proportion of red light falls within the first preset proportion range. If the preset condition is satisfied, it indicates that a chromatic aberration issue of red bias is generated, and in this case, the auxiliary light may also be used to compensate for the chromatic aberration, so that the proportion of red light in the emergent light of the light source assembly is adjusted to be within the second preset proportion range. The preset state of the chromatic aberration issue of red bias is similar to that of the chromatic aberration issue of green bias, which will not be described herein again.

In an embodiment, when the luminance of the main light is adjusted to account for 30% of the maximum luminance, the preset color rendering index may be 95, and the chromatic aberration of the light source system 10 may be −0.002. That is, by compensating the main light by using the auxiliary light containing blue light and red light that has a wavelength greater than 600 nm, the proportion of green light in the emergent light of the light source assembly can be effectively adjusted, so that the chromatic aberration of the light source system 10 is reduced from +0.0037 (indicating a color of green bias) to −0.002 (indicating a color of red bias), and thus the chromatic aberration issue is significantly improved. At the same time, the color rendering index of the light source system is increased from 10 to 95, the color reproduction degree is improved, and thus the uniformity of the light source outputs can be guaranteed.

In an actual application scenario, the main light may be a high color rendering light source (that is, a light source with a color rendering index greater than or equal to 95), and the color temperature of the main light is about 6100K. In order to compensate for the chromatic aberration issue of green bias of the main light caused by a relatively high excitation efficiency of green light and a relatively low excitation efficiency of red light when the main light source assembly 111 is in a cold driving state or a dimming state, the auxiliary light containing at least blue light and red light with the wavelength above 600 nm is synthesized, so that the chromatic aberration issue of green bias of the main light can be improved, and the missing spectrum in the main light can be compensated. In order to ensure that the color temperature of the light source system 10 remains constant during the process of compensating the main light, the auxiliary light is preferably consistent with the color temperature of the main light. For example, the color temperature of the auxiliary light can be maintained at 6100K, so that the color temperature of the light source system 10 can be constant during the process of the color compensation of the main light by the auxiliary light. If the color temperature of the light source system 10 needs to be increased, the color temperature of the auxiliary light can be greater than that of the main light, which is not limited herein.

Figure 2:
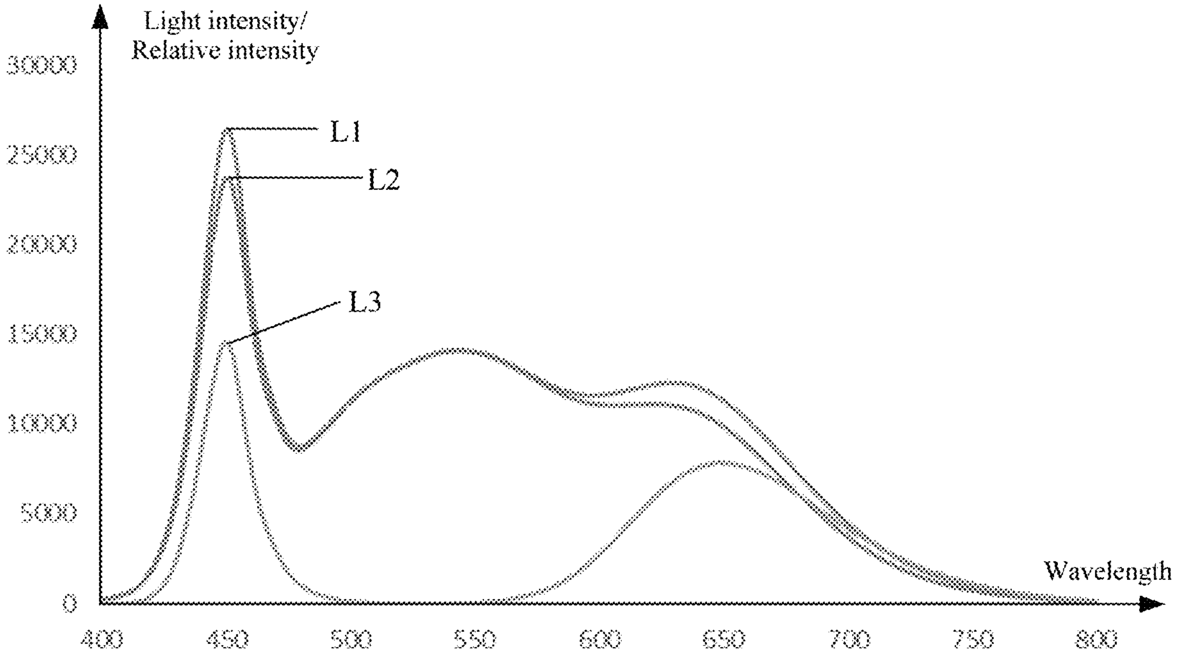
FIG. 2 is a spectrum comparison diagram according to the present disclosure.

FIG. 2 is a spectrum comparison diagram of the main light (L2), the auxiliary light (L3) and the auxiliary light compensation main light (L1) under a specific experimental test when the luminance of the light source assembly 11 accounts for 30% of the maximum luminance. After the experimental test, the experimental test results are shown in the following table, which is the color rendering index table of the compensation effect of the main light by the auxiliary light.

| Red light in | Color rendering index | | | | |
|---|---|---|---|---|---|
| the auxiliary light | Correlated color temperature (CCT/K) | Ra | R9 | R15 | Chromatic aberration (Duv) |
| 0 | 6113 | 92 | 79 | 93 | 0.0037 |
| 0.025 | 6116 | 94 | 90 | 97 | 0.0011 |
| 0.035 | 6118 | 94 | 96 | 99 | −0.0002 |
| 0.045 | 6119 | 95 | 98 | 98 | −0.0012 |
| 0.05 | 6120 | 95 | 96 | 98 | −0.002 |
| 0.055 | 6120 | 95 | 93 | 97 | −0.0026 |

As shown in the table above, with the increase of red light in the auxiliary light and then the compensation of the main light by the auxiliary light, the chromatic aberration of the emergent light of the light source assembly can be reduced from 0.0037 to −0.0026, the color rendering index Ra can be increased from 92 to 95, the color rendering index R9 can be increased from 79 to 98, and the color rendering index R15 can be increased from 93 to 99. Therefore, the auxiliary light can be used to significantly solve the chromatic aberration problem incurred by the light source system 10, compensate the color temperature of the light source system 10, and improve the color rendering index significantly.

It can be understood that, the above experimental test is just performed under the condition that the luminance of the light source assembly 11 accounts for 30% of the maximum luminance. Likewise, under other luminance conditions of the light source assembly 11, similar compensation effects can also be achieved. Thus, no further detailed explanation or listing will be made herein.

In another embodiment, when the main light source assembly 111 satisfies the preset condition, the light source system 10 may further include an auxiliary light control device (not shown in the figures). The auxiliary light control device is connected to the main light source assembly 111 and the auxiliary light source assembly 112, and is configured to increase the luminance of the auxiliary light to the preset luminance value based on the luminance of the main light and the preset dimming ratio. It can be understood that the auxiliary light control device can separately control the luminance of the auxiliary light according to the luminance of the main light and the preset dimming ratio, thereby dynamically compensating for insufficient light quality parameters of the light source assembly 11 under different luminance values or preset dimming ratios.

In another embodiment, the light source system 10 may further include a heat sink (not shown in the figures). The heat sink is arranged at a side of the light source assembly 11 away from the concentrating assembly 12. The heat sink is configured to carry the light source assembly 11 and dissipate heat from the light source assembly 11. It can be understood that the main light source assembly 111 and the auxiliary light source assembly 112 can be arranged at the same heat sink or at different heat sinks, which is not limited herein.

In an embodiment, the light source system 10 may further include a collection assembly (not shown in the figures). The collection assembly is arranged in the optical path of the emergent light of the light source assembly 11, which may collect the main light and/or the auxiliary light and emit the main light and/or the auxiliary light into the concentrating assembly 12. It can be understood that the main light and the auxiliary light may be collected using the same collection assembly, or may be collected using different collection assemblies, which is not limited herein.

In these embodiments, the main light source assembly and the auxiliary light source assembly are arranged, the main light source assembly is configured for generating main light, and the auxiliary light source assembly is configured for generating auxiliary light, so that the main light is compensated by the auxiliary light containing blue light and red light, in order to improve the chromatic aberration issue of the main light of green or red bias. While maintaining a constant color temperature of the light source system, the color rendering index of the light source system is increased to 95, so that the color reproduction degree is improved and the uniformity of the light source output can be guaranteed.

Figure 3:
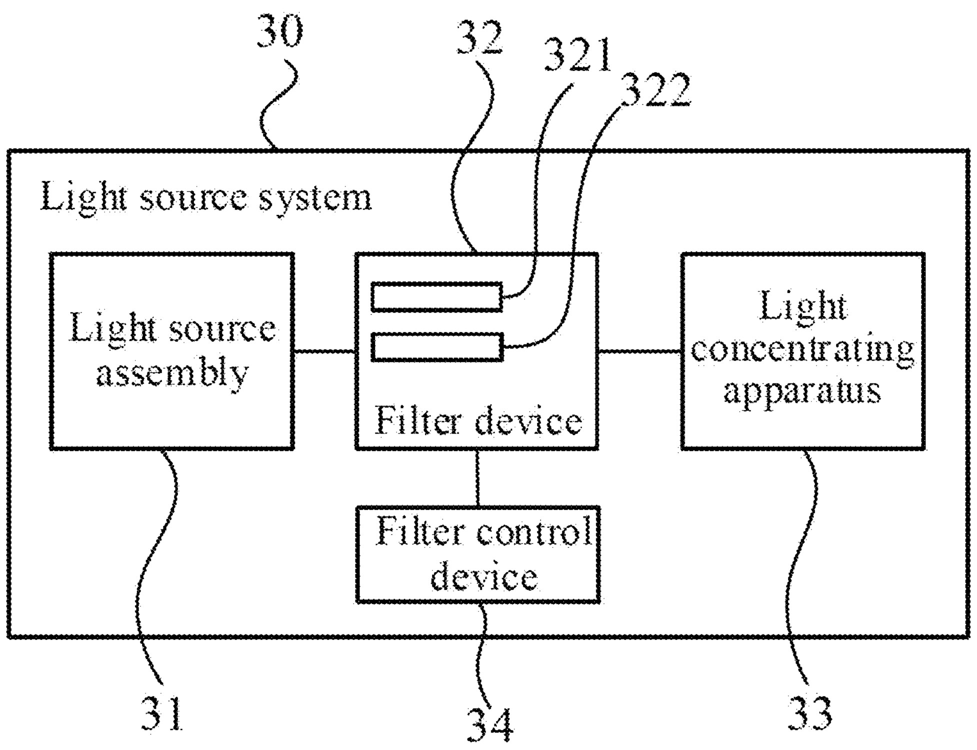
FIG. 3 is a schematic structural diagram of a light source system according to another embodiment of the present disclosure.

FIG. 3 is a schematic structural diagram of a light source system according to another embodiment of the present disclosure. The light source system 30 includes a light source assembly 31, a filter device 32, and a concentrating assembly 33.

The light source assembly 31 is configured to generate emergent light. When the light source assembly 31 satisfies the preset condition, a proportion of green light in the emergent light falls within the first preset proportion range, or a proportion of red light in the emergent light falls within the first preset proportion range, which has been illustrated in foregoing embodiments, and will not be described in detail herein again. The emergent light may include both the main light and the auxiliary light, or include only the main light, which is not limited herein.

The filter device 32 is arranged in the optical path of the emergent light of the light source assembly 31, and is configured to filter the color of the emergent light to obtain filtered light. In an embodiment, the filter device 32 is configured to filter green light in the emergent light, to adjust the proportion of green light in the emergent light of the light source assembly 31 to be within a second preset proportion range, improve the chromatic aberration phenomenon of the light source system 30, and further increase the color rendering index of the light source system 30 to a preset color rendering index. The concentrating assembly 33 is arranged in the optical path exited from the filter device 32, and is configured to process the light exited from the filter device 32 to obtain the projection light.

It can be understood that, when the proportion of the red light in the emergent light is within the first preset proportion range, the filter device 32 may also be configured to filter the red light in the emergent light when the proportion of the red light in the emergent light is within the first preset proportion range, that is, when the phenomenon of red deviation occurs, so that the proportion of the red light in the emergent light of the light source assembly 31 is adjusted to be within the second preset proportion range to compensate for the chromatic aberration of red bias phenomenon, which is not limited herein.

Figure 4:
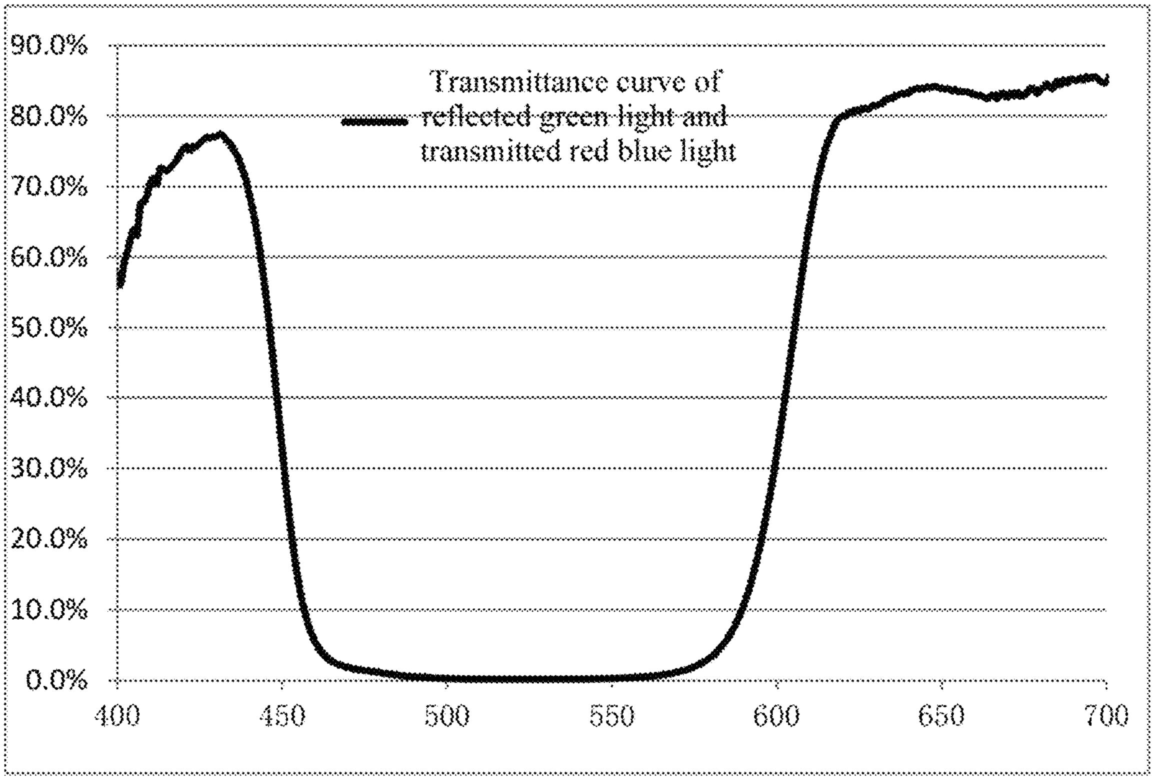
FIG. 4 is a schematic diagram of a transmittance curve of reflected green light and transmitted red blue light according to the present disclosure.

In an embodiment, the light source system 30 may further include a filter control device 34. The filter control device 34 is connected to the filter device 32, and is configured to adjust a transmittance of the filter device 32 for green light or red light based on the wavelength of the emergent light. In following embodiments, the adjustment of the transmittance for green light is described as an example, and the adjustment of the transmittance for red light is similar, which will not be described herein. As shown in FIG. 4, the abscissa represents wavelength, the ordinate represents transmittance. As the wavelength of the emergent light increases, the transmittance of the filter device 32 for the emergent light with a wavelength of 400 nm to 480 nm may increase first and then decrease. The transmittance of the filter device 32 for the emergent light with a wavelength of 480 nm to 575 nm is 0. As the wavelength of the emergent light increases, the transmittance of the filter device 32 for the emergent light with a wavelength of 575 nm to 620 nm may increase. The transmittance of the filter device 32 for the emergent light with a wavelength of 620 nm to 700 nm falls within a preset range. The minimum value of the preset range is greater than a preset transmittance. The preset transmittance is a maximum value of the transmittance of the filter device 32 for the emergent light with a wavelength of 575 nm to 620 nm, which is 80%, as shown in FIG. 4.

The filter device 32 may include two filters 321, 322 arranged in the optical path of the emergent light of the light source assembly 31. A distance between the filter and the light source assembly 31 is less than a first preset distance to obtain uniform filtered light. That is, the filter is arranged close to the light exit surface of the light source assembly 31 to obtain relatively uniform light spots. A reflective-transmissive film is arranged on the filter. The reflective-transmissive film is configured to reflect green light in the emergent light and transmit red light and blue light in the emergent light, so as to achieve the effect of reflecting green light and transmitting red light and blue light, thereby improving the chromatic aberration phenomenon of the light source system 30 and improving the color rendering index of the light source system 30.

Further, the two filters 321, 322 may include a first filter and a second filter that are arranged along a vertical downward direction. The filter control device 34 may generate a control signal to adjust a vertical distance between the first filter and the second filter, so as to control an area of the first filter and the second filter entering the optical path of the emergent light of the light source assembly 31, and further adjust the transmittance of the filters for the green light. The larger the vertical distance is, the higher the transmittance of the filters for the green light is.

Figure 5:
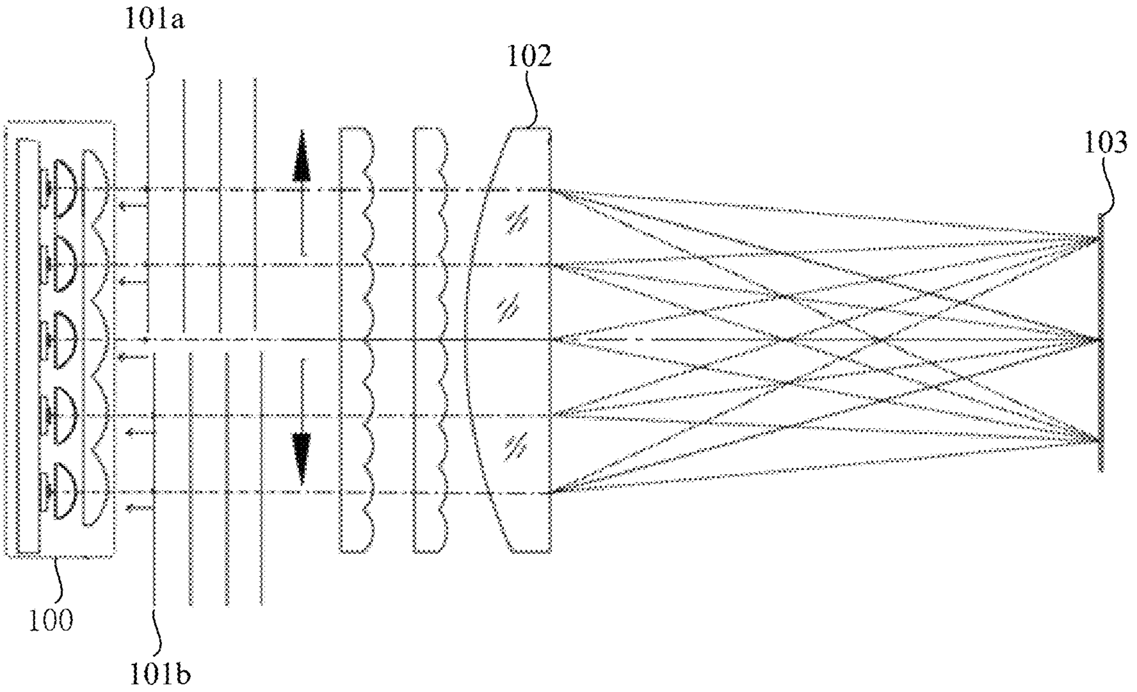
FIG. 5 is a schematic structural diagram of a light source system according to another embodiment of the present disclosure.

In an actual application scenario, as shown in FIG. 5, a first filter 101*a* and a second filter 101*b* arranged vertically downward may be arranged in an optical path of the emergent light of the light source assembly 100. The reflective-transmissive film of each filter has a filtering characteristic of reflecting green light and transmitting red and blue light. The area of the filter entering the optical path of the emergent light of the light source assembly 100 is controlled by the filter control device 34. The filter control device controls 34 the entering area of the filter by outputting different control signals. When the control signal emitted by the filter control device 34 is defined as "255", the two filters 321, 322 are completely closed, that is, completely entering the optical path. In this case, the emergent light may be completely modulated by the first filter 101*a* and the second filter 101*b*. When the control signal is defined as "0", the two filters 321, 322 are completely opened, that is, completely exiting the optical path. In this case, the emergent light is completely not modulated by the first filter 101*a* and the second filter 101*b*. It can be understood that when the control signal is defined as "0" to "255", the two filters 321, 322 are partially closed, that is, partially entering the optical path, so that the edge beams of the emergent light are modulated by the first filter 101*a* and the second filter 101*b*, and the central beams of the emergent light are not modulated by the first filter 101*a* and the second filter 101*b*. Moreover, the larger the value of the control signal is, the larger the area of the two filters 321, 322 entering the optical path is.

In an embodiment, the control signals "0" to "125" are generally output to control the two filter to partially enter the optical path of the emergent light of the light source assembly 100. As a result, the concentrating assembly 102 concentrates the modulated edge beams and the unmodulated central beams, and the modulated edge beams and the unmodulated central beams overlap at the diaphragm 103 to synthesize uniform modulated light spots, thereby obtaining the projection light, improving the chromatic aberration issue of green bias of the emergent light, and improving the color rendering index of the light source system 30. It can be understood that the selection of the output control signal can be set according to actual conditions or experience. The above just takes the control signals "0" to "125" an example, which is not limited herein.

In an embodiment, a filter device is arranged in the optical path of the emergent light of the light source assembly. The filter device adjusts the color of emergent light to filter green light in the emergent light and transmit red light and blue light in the emergent light, or filter red light in the emergent light and transmit green light and blue light in the emergent light, so as to improve the chromatic aberration issue of green or red bias of the emergent light, and further increase the color rendering index of the filtered light and the color reproduction degree. Meanwhile, the filter control device 34 is arranged to control the vertical distance between the first filter and the second filter, so as to adjust the area of the optical path of the light exited from the first filter and the second filter entering the light source assembly, thereby dynamically adjusting a filter rate of the filter can be dynamically adjusted according to application requirements, and customizing the compensation effect.

Figure 6:
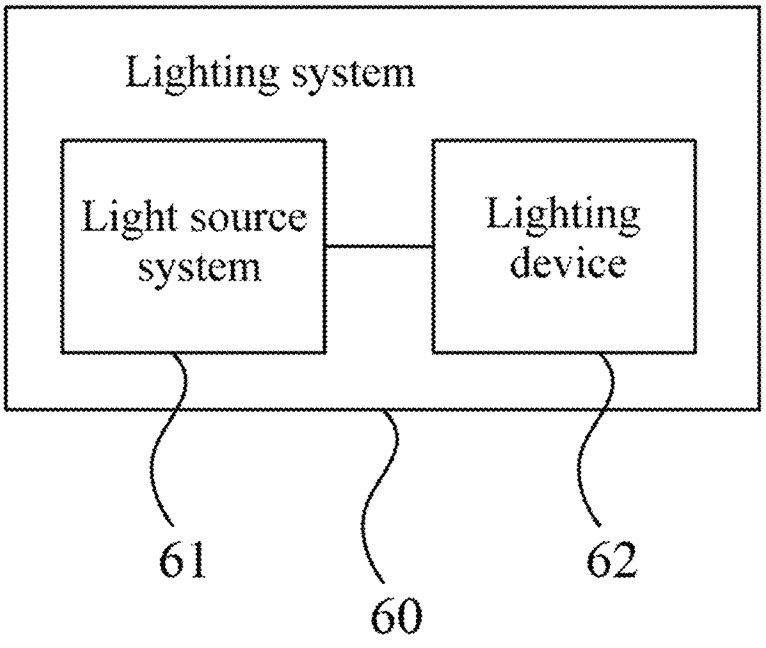
FIG. 6 is a schematic structural diagram of a lighting system according to an embodiment of the present disclosure.

FIG. 6 is a schematic structural diagram of a lighting system according to an embodiment of the present disclosure. The lighting system 60 includes a light source system 61 and a lighting device 62 that are connected to each other. The lighting device 62 is configured to emit light after receiving emergent light emitted by the light source system 61, and the light source system 61 is the light source system in the above embodiments.

Figure 7:
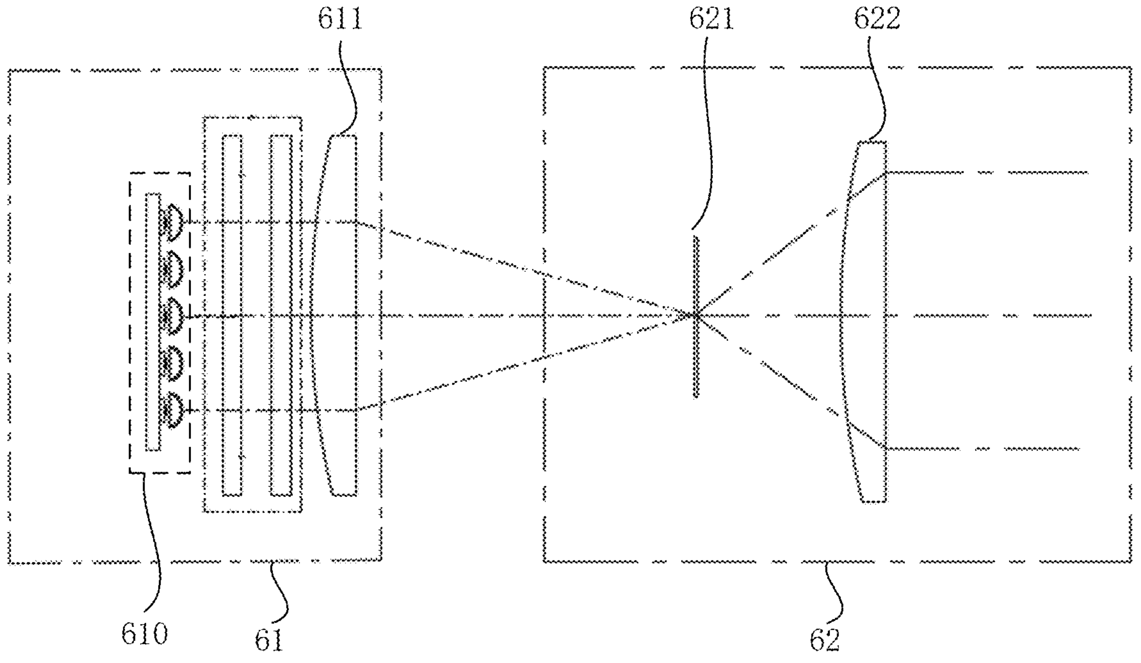
FIG. 7 is a schematic structural diagram of a lighting system according to another embodiment of the present disclosure.

Further, as shown in FIG. 7, taking the light source system 61 as the light source system shown in FIG. 1, for example, the light source system 61 may include a light source assembly 610 and a concentrating assembly 611. The lighting device 62 may include a grating 621 and a lens 622. The concentrating assembly 611 may concentrate the main light and the auxiliary light generated by the light source assembly 610 into a light hole on the grating to form the projection light.

The above are just embodiments of the present disclosure, but do not intend to limit the patent scope of the present disclosure. Any equivalent structure or equivalent flow transformation made by using the specification and the accompanying drawings of the present disclosure, or directly or indirectly applied in other related technical arts, are included in the protection scope of the present disclosure.

What is claimed is:

1. A light source system, comprising:

a light source assembly comprising a main light source assembly and an auxiliary light source assembly, wherein the main light source assembly is configured to generate main light, and the auxiliary light source assembly is configured to generate auxiliary light, when the main light source assembly is in a preset state that causes chromatic aberration, the preset state comprises at least one of a cold drive state, a dimming state, or a red light source fault state, and a proportion of green light or red light in the main light emitted by the main light source assembly is within a first preset proportion range; and the auxiliary light comprises blue light and red light, wherein the first preset proportion range is a proportion of a color-biased component in the main light with color bias when a color rendering index of the light source system is smaller than 95 under the preset state; and a concentrating assembly provided in an optical path of emergent light of the light source assembly, wherein the concentrating assembly is configured to concentrate the main light and the auxiliary light, wherein the auxiliary light is configured to compensate a color of the main light, to adjust a proportion of green light or red light in the emergent light of the light source assembly to be within a second preset proportion range, and further adjust the color rendering index of the light source system to a preset color rendering index.

2. The light source system according to claim 1, further comprising an auxiliary light control device, wherein the auxiliary light control device is connected to the main light source assembly and the auxiliary light source assembly, and the auxiliary light control device is configured to increase luminance of the auxiliary light to a preset luminance value based on luminance of the main light and a preset dimming ratio.

3. The light source system according to claim 1, wherein, a color temperature of the auxiliary light is 6100K when the luminance of the main light accounts for 30% of a maximum luminance; a preset color rendering index is 95, and a chromatic aberration of the emergent light is −0.002; and during color compensation of the main light by the auxiliary light, a color temperature of the light source system is constant.

4. The light source system according to claim 1, further comprising a heat sink, wherein the heat sink is provided at a side of the light source assembly away from the concentrating assembly, and the heat sink is configured to carry the light source assembly and dissipate heat of the light source assembly.

5. A light source system, comprising:

a light source assembly configured to generate emergent light; wherein when the main light source assembly is in a preset state that causes chromatic aberration, the preset state comprises at least one of a cold drive state, a dimming state, or a red light source fault state, and a proportion of green light or red light in the emergent light is within a first preset proportion range, wherein the first preset proportion range is a proportion of a color-biased component in the emergent light with color bias when a color rendering index of the light source system is smaller than 95 under the preset state;

a filter device provided in an exit optical path of the light source assembly and configured to filter a color of the emergent light to obtain filtered light, wherein the filter device is configured to filter green light or red light with a proportion within the first preset proportion range in the emergent light, to adjust a proportion of the green light or the red light in the filtered light to be within a second preset proportion range, and further adjust a color rendering index of the light source system to a preset color rendering index; and a concentrating assembly provided in an exit optical path of the filter device, wherein the concentrating assembly is configured to process light emitted by the filter device.

6. The light source system according to claim 5, further comprising a filter control device, wherein the filter control device is connected to the filter device, and is configured to adjust a transmittance of the filter device to the green light or the red light based on a wavelength of the emergent light.

7. The light source system according to claim 6, wherein, the filter device comprises two filters provided in the exit optical path of the light source assembly, and a distance between the filters and the light source assembly is smaller than a first preset distance to make a light spot formed by overlapping at a diaphragm after filtered light is condensed by the concentrating assembly more uniform; at least one of the two filters is provided with a reflective-transmissive film, and the reflective-transmissive film is configured reflect green light in the emergent light and transmitting red light and blue light in the emergent light; or the reflective-transmissive film is configured to reflect red light in the emergent light and transmitting green light and blue light in the emergent light.

8. The light source system according to claim 7, wherein, the two filters comprise a first filter and a second filter arranged along a vertical downward direction; and the filter control device is configured to generate a control signal to adjust a vertical distance between the first filter and the second filter, wherein the larger the vertical distance is, the higher a transmittance of the filters to the green light is.

9. The light source system according to claim 6, wherein, a transmittance of the filter device to emergent light with a wavelength of 400 nm to 480 nm increases first and then decreases as the wavelength of the emergent light increases;

a transmittance of the filter device to emergent light with a wavelength of 480 nm to 575 nm is 0;

a transmittance of the filter device to emergent light with a wavelength of 575 nm to 620 nm increases as the wavelength increases; and a transmittance of the filter device to emergent light with a wavelength of 620 nm to 700 nm falls within a preset range, a minimum value of the preset range is greater than a preset transmittance, and the preset transmittance is a maximum value of a transmittance of the filter device to emergent light with the wavelength of 575 nm to 620 nm.

10. A lighting system, comprising:

a lighting device; and a light source system, wherein the light source system comprises:

a light source assembly comprising a main light source assembly and an auxiliary light source assembly, wherein the main light source assembly is configured to generate main light, and the auxiliary light source assembly is configured to generate auxiliary light, when the main light source assembly is in a preset state that causes chromatic aberration, the preset state comprises at least one of a cold drive state, a dimming state, or a red light source fault state, and a proportion of green light or red light in the main light emitted by the main light source assembly is within a first preset proportion range; and the auxiliary light comprises blue light and red light, wherein the first preset proportion range is a proportion of a color-biased component in the main light with color bias when a color rendering index of the light source system is smaller than 95 under the preset state; and a concentrating assembly provided in an optical path of emergent light of the light source assembly, wherein the concentrating assembly is configured to concentrate the main light and the auxiliary light;

wherein the auxiliary light is configured to compensate a color of the main light, to adjust a proportion of green light or red light in the emergent light of the light source assembly to be within a second preset proportion range, and further adjust a color rendering index of the light source system to a preset color rendering index; and wherein the lighting device and the light source system are connected to each other, and the lighting device is configured to emit light after receiving projection light emitted by the light source system.

* * * * *